United States Patent
Jurgens et al.

(10) Patent No.: US 9,646,057 B1
(45) Date of Patent: *May 9, 2017

(54) SYSTEM FOR DISCOVERING IMPORTANT ELEMENTS THAT DRIVE AN ONLINE DISCUSSION OF A TOPIC USING NETWORK ANALYSIS

(71) Applicant: HRL Laboratories, LLC, Malibu, CA (US)

(72) Inventors: David A. Jurgens, Montreal (CA); Tsai-Ching Lu, Wynnewood, PA (US); Veronika Strnadova, Goleta, CA (US)

(73) Assignee: HRL Laboratories, LLC, Malibu, CA (US)

(*) Notice: Subject to any disclaimer, the term of this patent is extended or adjusted under 35 U.S.C. 154(b) by 340 days.

This patent is subject to a terminal disclaimer.

(21) Appl. No.: 14/452,012

(22) Filed: Aug. 5, 2014

Related U.S. Application Data (60) Provisional application No. 61/862,444, filed on Aug. 5, 2013, provisional application No. 61/862,467, filed on Aug. 5, 2013.

(51) Int. Cl.
*G06F 17/30* (2006.01)
*H04L 29/08* (2006.01)
*H04L 29/06* (2006.01)
*H04L 12/58* (2006.01)

(52) U.S. Cl.
CPC .......... *G06F 17/3053* (2013.01); *H04L 51/32* (2013.01); *H04L 65/403* (2013.01); *H04L 67/30* (2013.01)

(58) Field of Classification Search
CPC ......... H04L 45/12; H04L 45/02; H04L 45/24; H04L 51/32; H04L 67/30;

(Continued)

(56) References Cited

U.S. PATENT DOCUMENTS

| | | | |
|---|---|---|---|
| 8,976,710 B2* | 3/2015 | Indukuri | G06Q 10/00 370/255 |
| 2006/0200434 A1* | 9/2006 | Flinn | G06N 99/005 706/12 |

(Continued)

OTHER PUBLICATIONS

Cheng, Z.; Caverlee, J.; and Lee, K. 2010. You are where you tweet a content-based approach to geo-locating twitter users. In Proceedings of the 19th ACM international confer-ence on Information and knowledge management, 759-768. ACM.

(Continued)

*Primary Examiner* — Thanh-Ha Dang
(74) *Attorney, Agent, or Firm* — Tope-McKay & Associates (57) ABSTRACT

Described is system and method for discovering important elements that drive an online discussion. The system receives, as input, a message from an online discussion related to a topic. The message is analyzed for information related to the message. A graph comprising a plurality of nodes is generated, where each of the plurality of nodes represents an entity. The graph is updated over time as additional messages from the online discussion are received, such that additional nodes are generated and linked with at least one of the plurality of nodes by paths. A closeness value for each node is determined based on the path lengths. The entities are ranked based on the closeness values, thereby providing a ranking of the entities by level of importance in the online discussion to a user.

16 Claims, 6 Drawing Sheets

(58) Field of Classification Search
CPC ......... G06F 17/30864; G06F 17/30539; G06F 17/30979; G06F 17/3053
USPC ........................................................ 707/749
See application file for complete search history.

(56) References Cited

U.S. PATENT DOCUMENTS

| | | | | |
|---|---|---|---|---|
| 2008/0109730 | A1* | 5/2008 | Coffman | G06Q 30/02 715/733 |
| 2008/0313119 | A1* | 12/2008 | Leskovec | G06F 17/30722 706/46 |
| 2009/0119173 | A1* | 5/2009 | Parsons | G06Q 10/107 705/319 |
| 2011/0071953 | A1* | 3/2011 | Shen | G06Q 30/02 705/319 |
| 2011/0145719 | A1* | 6/2011 | Chen | G06Q 10/10 715/739 |
| 2012/0044835 | A1* | 2/2012 | Wang | H04L 45/00 370/255 |
| 2012/0066073 | A1* | 3/2012 | Dilip | G06Q 30/0269 705/14.66 |
| 2012/0278261 | A1* | 11/2012 | Lin | G06N 5/003 706/12 |
| 2013/0198240 | A1* | 8/2013 | Ameri-Yahia | G06Q 30/02 707/798 |
| 2013/0254303 | A1* | 9/2013 | Cheng | H04L 51/32 709/206 |
| 2014/0012870 | A1* | 1/2014 | Wark | G06F 17/30539 707/769 |
| 2014/0211632 | A1* | 7/2014 | Saad | H04L 45/62 370/238 |
| 2014/0365647 | A1* | 12/2014 | Haraszti | H04L 41/12 709/224 |

OTHER PUBLICATIONS

De Choudhury, M.; Counts, S.; and Czerwinski, M. 2011. Identifying relevant social media content: leveraging information diversity and user cognition. In Proceedings of the 22nd ACM conference on Hypertext and hypermedia, 161-170. ACM.

Lee, R.; Wakamiya, S.; and Sumiya, K. 2011. Discovery of unusual regional social activities using geo-tagged microblogs. World Wide Web 14(4):321-349.

Romero, D.; Meeder, B.; and Kleinberg, J. 2011. Differences in the mechanics of information diffusion across topics: idioms, political hashtags, and complex contagion on twitter. In Proceedings of the 20th international conference on World wide web, 695-704. ACM.

Ruiz, E.; Hristidis, V.; Castillo, C.; Gionis, A.; and Jaimes, A. 2012. Correlating financial time series with micro-blogging activity. In WSDM'12.

Shamma, D.; Kennedy, L.; and Churchill, E. 2010. Tweetgeist: Can the twitter timeline reveal the structure of broad-cast events? In CSCW 2010.

Brin, S.and Page, L. 1998. "The anatomy of a large-scale hypertextual Web search engine". Computer Networks and ISDN Systems 30: 107-117.

Stmadova, V., Jurgens, D., and Lu, T-C. 2013 Characterizing Online Discussions in Microblogs Using Network Analysis. In Proceedings of AAAI Spring Symposium Series.

Veronika Stmadova, David Jurgens, and Tsai-Ching Lu, "Characterizing Online Discussions in Microblogs Using Network Analysis," Analyzing Microtext: Papers from the 2013 Association for the Advancement of Artificial Intelligence (AAAI) Spring Symposium, vol. SS-13-01.

Crane, R., and Sornette, D. 2008. Robust dynamic classes revealed by measuring the response function of a social system. Proceedings of the National Academy of Sciences 105(41):15649-15653.

* cited by examiner

SYSTEM FOR DISCOVERING IMPORTANT ELEMENTS THAT DRIVE AN ONLINE DISCUSSION OF A TOPIC USING NETWORK ANALYSIS

GOVERNMENT LICENSE RIGHTS

This invention was made with government support under U.S. Government Contract Number D12PC00285 Open Source Indicators. The government has certain rights in the invention.

CROSS-REFERENCE TO RELATED APPLICATIONS

This is a Non-Provisional Application of U.S. Provisional Application No. 61/862,444, filed on Aug. 5, 2013, entitled, "Method for Discovering Important Elements that Drive an Online Discussion of a Topic Using Network Analysis."

This is also a Non-Provisional Application of U.S. Provisional Application No. 61/862,467, filed on Aug. 5, 2013, entitled, "Method for Gauging Public Interest in a Topic Using Network Analysis of Online Discussions."

BACKGROUND OF THE INVENTION (1) Field of Invention

The present invention relates to a system for discovering important elements that drive an online discussion of a topic and, more particularly, to a system for discovering important elements that drive an online discussion of a topic using network analysis.

(2) Description of Related Art

The large scale of microblogging activity has given rise to free-form discussions in which participants may join and leave at any time. Measuring the public interest in a topic through its online discussions in microblogs can be difficult due to the sheer scale of microblog data (e.g., 100 million new posts per day to Twitter™), as well as the variety of language used in the discussion. Furthermore, the frequency with which entities appear in a discussion may not correlate with their importance. For example, consider a spammer who repeatedly posts the same message about a topic to a discussion. The elements of that message will have a high frequency; however, their relative importance (i.e., whether other discussion participants build on those messages), may be very low due their status as spam. Furthermore, within a single discussion many subtopics may emerge, with varying degrees of frequency. Detecting and ranking the important elements of these sub-discussions can be difficult using a frequency-based analysis since a less frequent element (e.g., a news story) might be discussed by a small core group, whereas another news story may just be mentioned more times by unrelated individuals.

Several works have leveraged the structure of microblog discussions to discover important features individually, such as hyperlinks (see the List of Incorporated Cited Literature References, Literature Reference No. 6), hashtags (see Literature Reference No. 4), events (see Literature Reference No. 3), or Tweets™ themselves (see Literature Reference No. 2). For example, Romero, Meeder, and Kleinberg (see Literature Reference No. 4) analyzed the growth and persistence of hashtags in different topic categories, demonstrating that the emergence of a popular hashtag is highly topic dependent. Their method could be used to measure important hashtags. However, it does not take into account users, uniform resource locators (URLs), Tweets™, or locations.

In a separate work, De Choudhury, Counts, and Czerwinski (see Literature Reference No. 2) considered a problem related to what is most important for a search result given a search query for a term. Using microtext, social network, and discussion attributes that were selected based on a user survey, they found that Tweets™ which exemplified diversity in these attributes were among the best to return according to a user assessment. Their work could be considered an alternate approach to identifying the most important Tweets™ in a discussion. However, their method does not take multiple entities into account.

Ruiz et al. (see Literature Reference No. 5) proposed a similar method for constructing networks from Twitter™ messages about a publically traded company and demonstrated how the properties of this network could be used to predict stock price changes. Their network representation does not consider the location of the users, which is essential to identifying geographically-local discussions. Furthermore, their method did not consider normalizing the diameter of the graph and, therefore, was not effective in using the diameter for the purposes of their paper.

The representation of discussions as interconnected networks of entities has not been considered in the prior art. Existing processes for discovering important elements have largely relied on frequency-based analysis or on identifying important users and analyzing their content. Thus, a continuing need exists for a method that relies upon the interconnectedness of all of a discussion's entities as a way of discovering which elements are important to a discussion.

SUMMARY OF THE INVENTION

The present invention relates to a system for discovering important elements that drive an online discussion of a topic and, more particularly, to a system for discovering important elements that drive an online discussion of a topic using network analysis. The system comprises one or more processors and a memory having instructions such that when the instructions are executed, the one or more processors perform multiple operations. A message is received as input from an online discussion related to a topic. The message is analyzed for information related to the message. A graph comprising a plurality of nodes is generated, wherein each of the plurality of nodes represents an entity. The graph is updated over time as additional messages from the online discussion are received, such that additional nodes are generated and linked with at least one of the plurality of nodes by paths having path lengths. A closeness value is determined for each node based on the path lengths. The entities are ranked based on the closeness values, thereby providing a ranking of the entities by level of importance in the online discussion. The ranking of the entities is output to a user.

In another aspect, the closeness value for each node is determined according to the following:

$$cl(v) = \frac{1}{\frac{1}{|V|}\sum_{u \in V} d_G(u, v)},$$

where $d_G(u, v)$ denotes the shortest path length between nodes n and v, $\Sigma$ denotes a summation, $\epsilon$ denotes is an element of, and V is the total number of nodes in the graph.

In another aspect, the closeness value represents a relative centrality of an entity to all other entities.

In another aspect, the information related to the message is selected from a group consisting of user information, location information, hyperlink information, and annotation information.

In another aspect, the location information is obtained from at least one of geo-coordinate information related to the message or location information in a user profile from the online discussion.

In another aspect, the present invention comprises a system for discovering important elements that drive an online discussion of a new consumer product. The system comprises one or more processors and a memory having instructions such that when the instructions are executed, the one or more processors perform multiple operations. A message is received as input from an online discussion related to a topic. The message is analyzed for information related to the message. A graph comprising a plurality of nodes is generated, wherein each of the plurality of nodes represents an entity. The graph is updated over time as additional messages from the online discussion are received, such that additional nodes are generated and linked with at least one of the plurality of nodes by paths having path lengths. A closeness value is determined for each node based on the path lengths. The entities are ranked based on the closeness values, thereby providing a ranking of the entities by level of importance in the online discussion. The ranking of the entities is output to a user, wherein the user monitors an online discussion among consumers related to a new consumer product and uses the ranking of the entities to identify a set of discussion elements that drive the online discussion of the new consumer product.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for discovering important elements that drive an online discussion of a topic and, more particularly, to a system for discovering important elements that drive an online discussion of a topic using network analysis. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Subsequently, a description of various principal aspects of the present invention is provided. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Cheng, Z.; Caverlee, J.; and Lee, K. 2010. "You are Where you Tweet: A Content-Based Approach to Geo-Locating Twitter Users." In Proceedings of the 19th ACM International Conference on Information and Knowledge Management, 759-768. ACM.
2. De Choudhury, M.; Counts, S.; and Czerwinski, M. 2011. "Identifying Relevant Social Media Content: Leveraging Information Diversity and User Cognition. In Proceedings of the 22nd ACM Conference on Hypertext and Hypermedia, 161-170. ACM.
3. Lee, R.; Wakamiya, S.; and Sumiya, K. 2011. Discovery of Unusual Regional Social Activities Using Geo-Tagged Microblogs. World Wide Web—Internet Web Inf Syst, 14(4):321-349.
4. Romero, D.; Meeder, B.; and Kleinberg, J. 2011. Differences in the Mechanics of Information Diffusion Across Topics: Idioms, Political Hashtags, and Complex Contagion on Twitter. In Proceedings of the 20th International Conference on World Wide Web, 695-704. ACM.
5. Ruiz, E.; Hristidis, V.; Castillo, C.; Gionis, A.; and Jaimes, A. 2012. Correlating Financial Time Series with Micro-Blogging Activity. In WSDM' 12.
6. Shamma, D.; Kennedy, L.; and Churchill, E. 2010. Tweetgeist: Can the Twitter Timeline Reveal the Structure of Broadcast Events? In CSCW 2010.
7. Brin, S. and Page, L. 1998. "The anatomy of a large-scale hypertextual Web search engine". Computer Networks and ISDN Systems 30: 107-117.
8. Strnadova, V., Jurgens, D., and Lu, T-C. 2013. Characterizing Online Discussions in Microblogs Using Network Analysis. In Proceedings of AAAI Spring Symposium Series.

(2) Principal Aspects

The present invention has three "principal" aspects. The first is a system for discovering important elements that drive an online discussion of a topic. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for discovering important elements that drive an online discussion of a topic. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Specific Details

The large scale of microblogging activity has given rise to free-form discussions in which participants may join and leave at any time. Furthermore, for a given topic, many factors, such as news stories or region-specific interest, may drive new users to participate. For example, Romero, Meeder, and Kleinberg (see Literature Reference No. 4) noted that topical categories often have very different patterns in how information is shared in their discussions. However, it is often unknown what drives the discussion of a specific topic. That is, are specific people responsible for ensuring the discussion continues? Does geographic locality or specific related content, such as media generated from the continuous news cycle, drive discussion?

Described is a system and method for uncovering these conversation-driving entities based on a network analysis of the discussion. The system uses a novel graph methodology to represent the overarching discussion of a topic in microblogs as a graph with interconnected users, topics, locations, hashtags, and hyperlinks. The process then analyzes each entity in the graph in terms of its network properties to rank them by importance. A unique aspect of the system is using a network measure of closeness, which enables identifying not only the most important elements, but also the entities of secondary and tertiary importance from the other entities that do not drive the discussion. Furthermore, the methodology described herein is language-independent and enables real-time monitoring of changes to the discussion.

Figure 1:
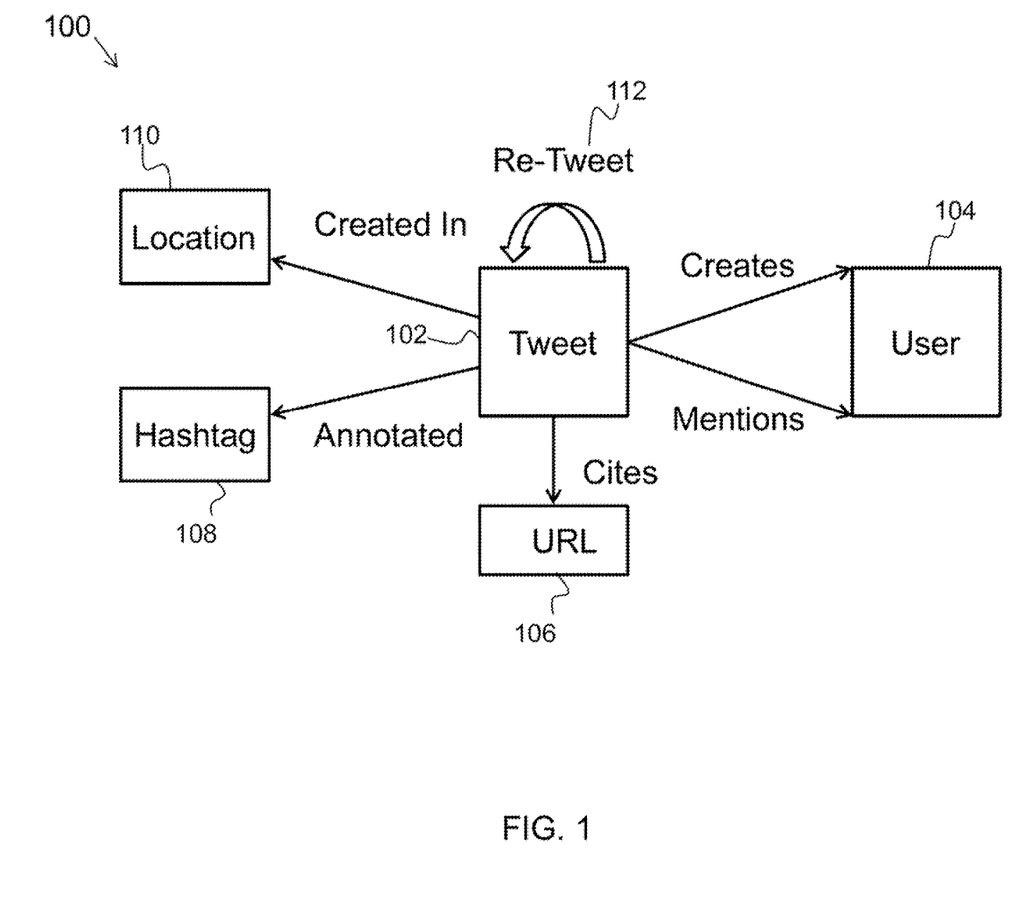
FIG. 1 is an illustration of a discussion network according to the principles of the present invention.

As shown in FIG. 1, a network 100 is constructed in which individual Tweets™ 102 link to four other node types: users 104, hyperlinks (URL 106), hashtags 108, and locations 110. The users 104 node provides information related to who created and/or mentioned the Tweet™ 102. The URL 106 node provides information related to where the Tweet™ 102 is cited. The hashtags 108 node provides information related to how the Tweet™ 102 is annotated. A hashtag is a word or phrase preceded by a hash or pound sign (#) and used to identify messages on a specific topic. The locations 110 node provides information related to the location of the Tweet™ 102. As can be appreciated by one skilled in the art, the node types and number that are used in construction of the network illustrated in FIG. 1 need not be limited to those described above. Furthermore, references to Tweets™ and Twitter™ are used as a non-limiting example of textual messages between users of a social network. Thus, references to Tweets™ and Twitte™ are used only for illustrative purposes, and the present invention is not intended to be limited thereto.

As new Tweets™ are added to the network 100, nodes are generated based on the Tweet™'s content and are linked with existing nodes in the discussion. As the online discussion grows, the network 100 grows more connected to elements that are shared in common between many Tweets™ 102. For example, a viral news story would generate a graph with many Tweets™ 102 pointing to the same hyperlink (URL 106), and possibly to a Tweet™ 102 that was shared multiple times (i.e., retweet 112), whereas a discussion from a single city would have many Tweets™ 102 linked to the same location 110. Importantly, this network 100 representation of an online discussion enables modeling of shared relations between the features.

For associating Tweets™ with locations, a two-step process is used. First, approximately 1% of all Tweets™ come with geo-coordinates, which allows one to accurately recover the location at which a Tweet™ originated. For instance, the Google™ Maps Reverse Geocoding service (developed by Google™, located at 1600 Amphitheatre Parkway Mountain View, Calif. 94043) can be used to convert geo-coordinates into a canonical city-level location name. Second, when geo-coordinates are not available, a method which looks into a user's profile for a location and uses that as the location of the Tweeted message can be followed (see Literature Reference No. 1). Location names from user profiles were further normalized to the same set of city labels. Furthermore, using the Tweets™ with geo-coordinates as ground truth, the standard errors for profile-based location names were calculated, and those names with a median error above 25 kilometers were removed, ensuring a higher precision at the expense of recall. Ultimately, in experimental studies, approximately 32% of all messages were linked with a location.

To identify and rank the key elements of a discussion, the closeness value for each node is calculated. As a non-limiting example, the closeness of a node v is calculated according to the following:

$$cl(v) = \frac{1}{\frac{1}{|V|}\sum_{u \in V} d_G(u, v)},$$

where $d_G(u, v)$ denotes the shortest path length between nodes u and v, and V is the total number of nodes in the graph (see Literature Reference No. 8). As can be appreciated by one skilled in the art, other closeness measures may be used. Closeness measures the relative centrality of an entity to all other discussion elements. A low closeness score indicates that many of the other entities in the graph (e.g., people (users), locations, URLs, and hashtags) are not being mentioned in the same context. Conversely, a high closeness score indicates that many other entities are mentioned in the same messages, or are mentioned in messages directly related to entities that are linked to the current one. Once the closeness value is calculated for all entities, the entities are ranked by closeness. Here, the entities with the largest values are most important to the discussion.

Figure 2:
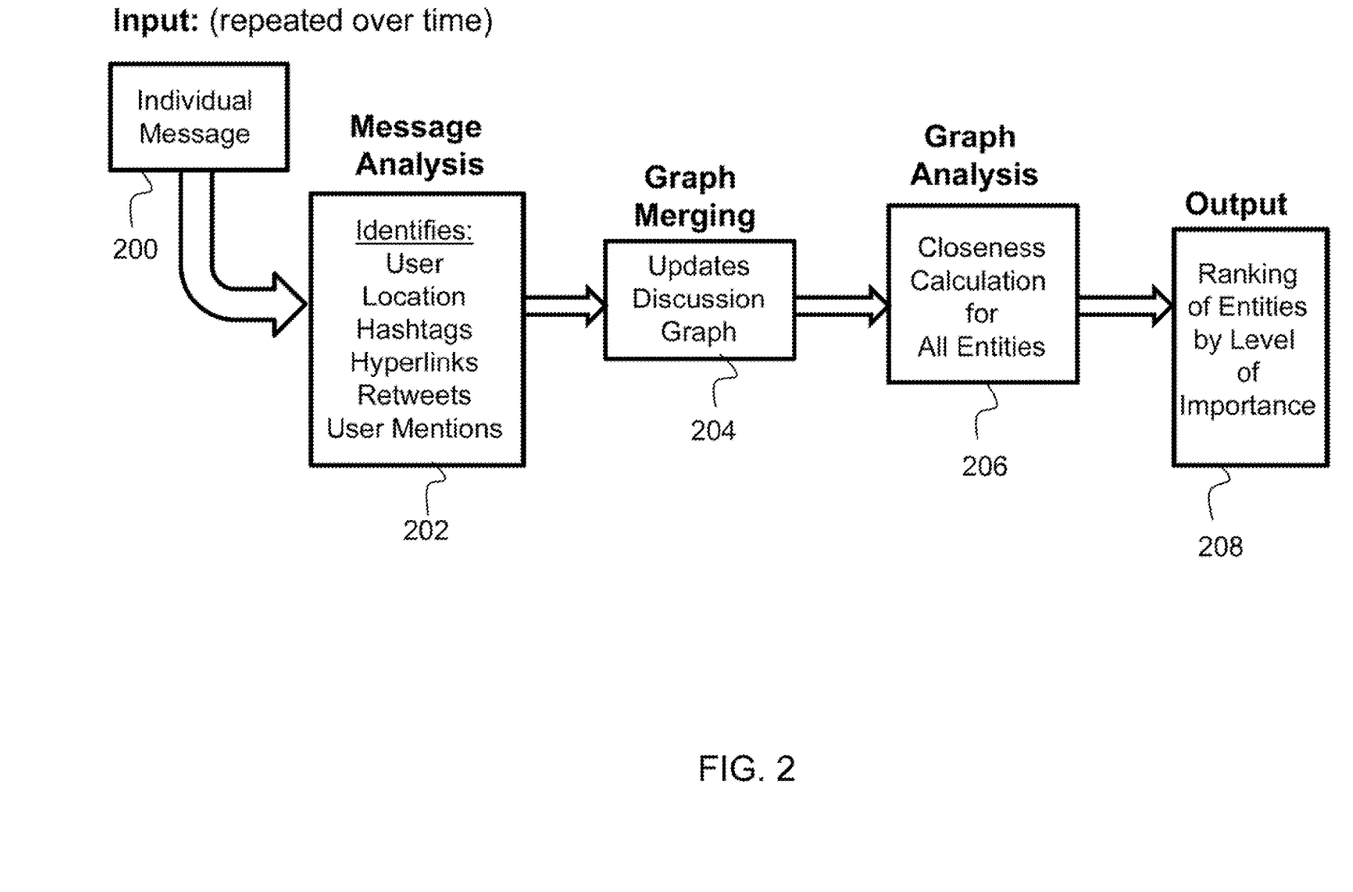
FIG. 2 is a flow diagram illustrating how new messages are processed according to the principles of the present invention.

FIG. 2 is a flow diagram illustrating the process flow of the system according to the principles of the present invention. First, an individual message 200 (e.g., Tweet™) is received as input. This step is repeated over time as additional individual messages 200 come in during a discussion. In a message analysis step 202, the system identifies information related to the individual message 200. Non-limiting examples of related information include user name, location, hashtags, hyperlinks, retweets, and user mentions. In a graph merging step 204, the discussion network/graph is constructed (for a first individual message) or updated as described above. In a graph analysis step 206, a closeness value for all entities is calculated. Finally, in an output step 208, a ranking of the entities by level of importance is output.

Figure 3A:
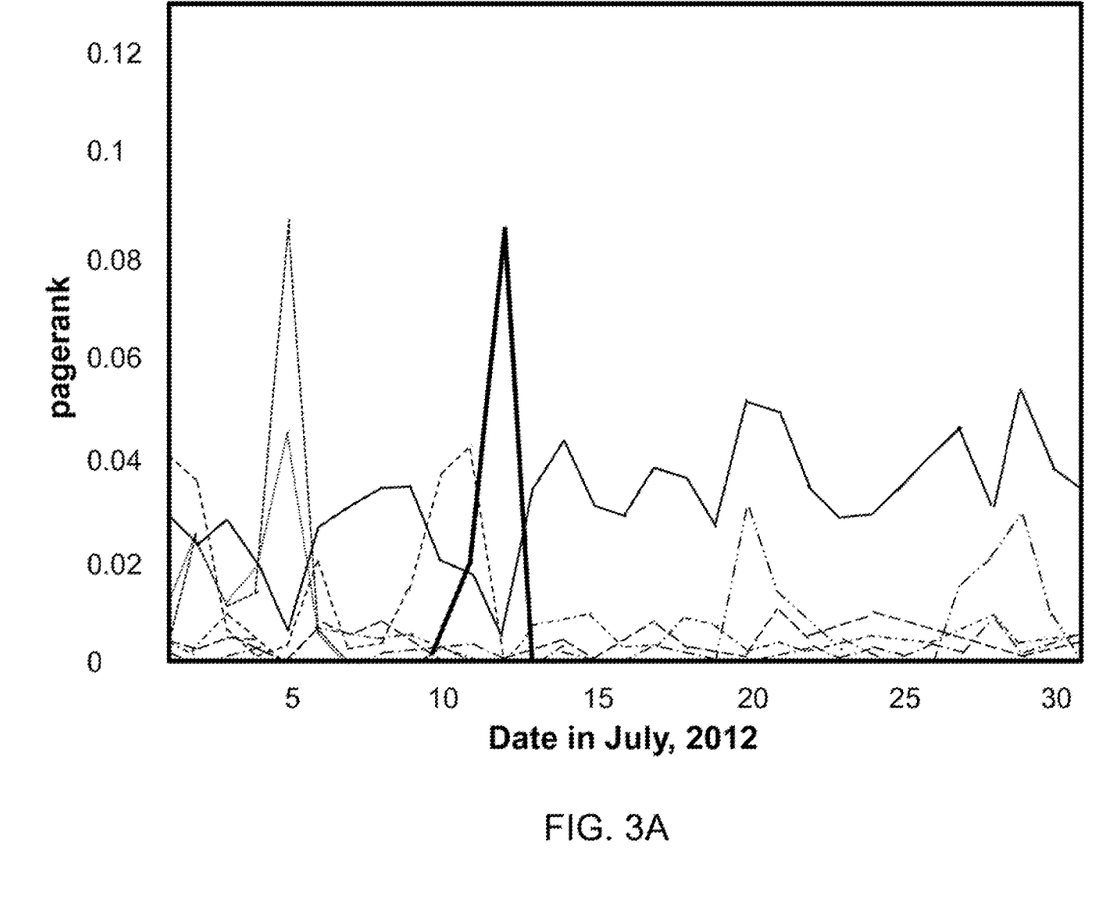
FIG. 3A is a plot of inferred importance levels of hashtags for a graph for keyword "Cardinals" according to PageRank.
Figure 3B:
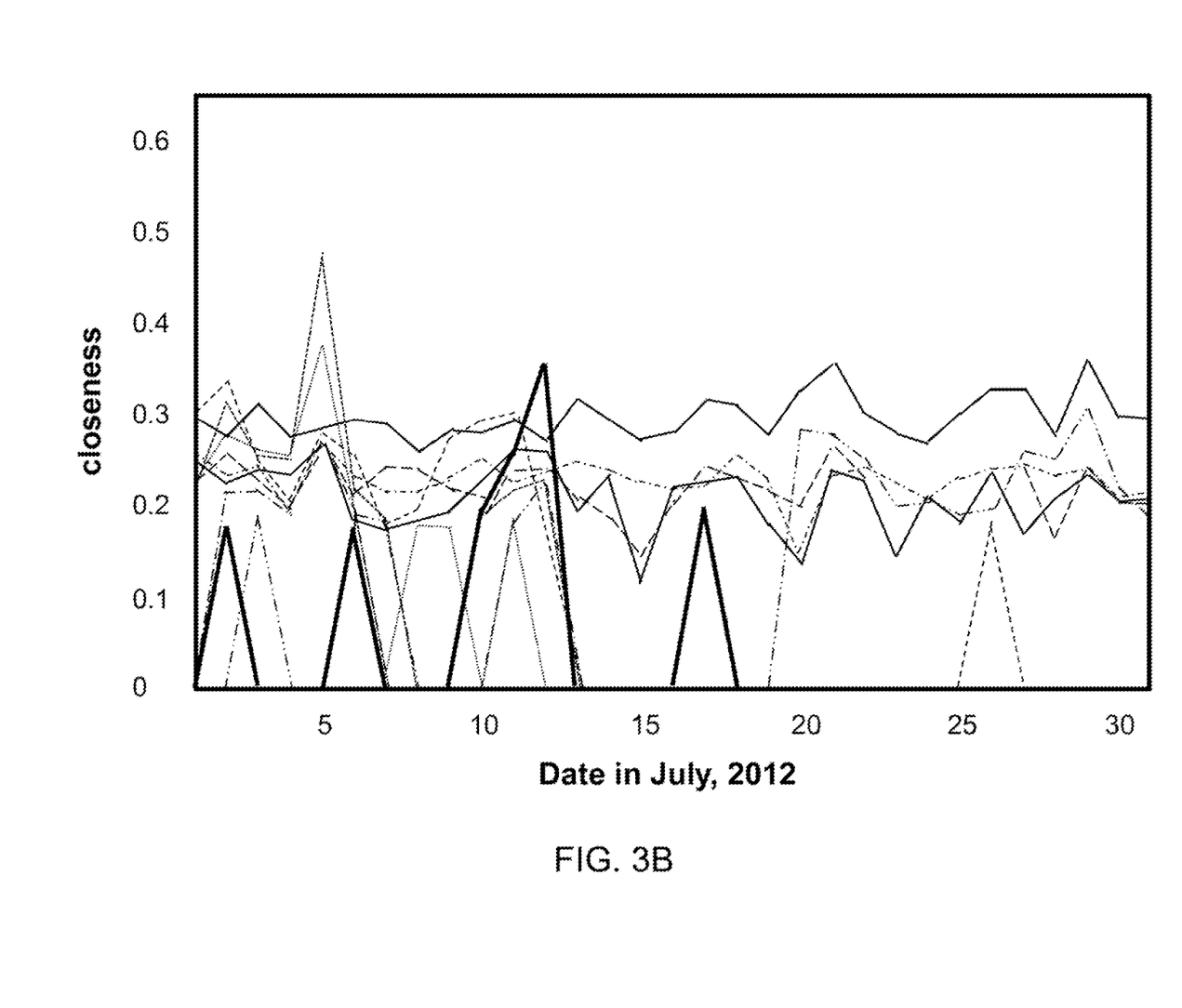
FIG. 3B is a plot of inferred importance levels of hashtags for a graph for keyword "Cardinals" according to closeness according to the principles of the present invention.

FIG. 3A shows closeness values for a graph built for the baseball team "Cardinals" over the month of July 2012 in comparison to the values produced by PageRank shown in FIG. 3B. PageRank is an algorithm used by the Google™ web search engine to rank websites in their search engine results (see Literature Reference No. 7). PageRank is a popular network measure of importance. The plot in FIG. 3A illustrates the ranking for the ten hashtags (illustrated by various line types) that had the highest PageRank values throughout the month, including #CardinalNation, #Take-Jake, #Cubs, #stlcards, #MLB, #ASG, #BestTeam, #Final-Vote, #FreesePlease, and #Cardinals. The plot in FIG. 3B shows the same ten hashtags (illustrated by various line types) that had the highest closeness scores according to the principles of the present invention. While both methods identify the same hashtags, it is only with the closeness value of the present invention that one is able to separate the hashtags into different levels of importance. Unlike the PageRank values depicted in FIG. 3A, the closeness value of the present invention is able to separate out entities with lesser importance, as shown in FIG. 3B. The entities with lesser importance are represented by the cluster of curves at the bottom region of the plot in FIG. 3A. In FIG. 3B, all curves are separated into different levels of importance, such that one can easily distinguish between the various entities.

Specifically, using closeness provides two advantages. First, the distribution of closeness values allows for better separation of entities of secondary and tertiary importance (FIG. 3B). In contrast, all entities but the few most dominant have low PageRank scores (FIG. 3A), which makes them difficult to properly separate from other unimportant entities (not shown) that have similarly low Pagerank values. Second, the closeness values are much less sensitive to fluctuations in discussion frequencies (i.e., are more stable over time), which enables better temporal comparison of the relative importance of an item over time.

The invention described herein can be applied to any system that needs to identify features (i.e., discussion elements) that capture collective behavior for prediction. Additionally, the present invention has applications for programs that require finding what entities are most important in online discussions. For instance, a company could monitor the discussion around a new product line to estimate what drives the discussion of the product.

Figure 4:
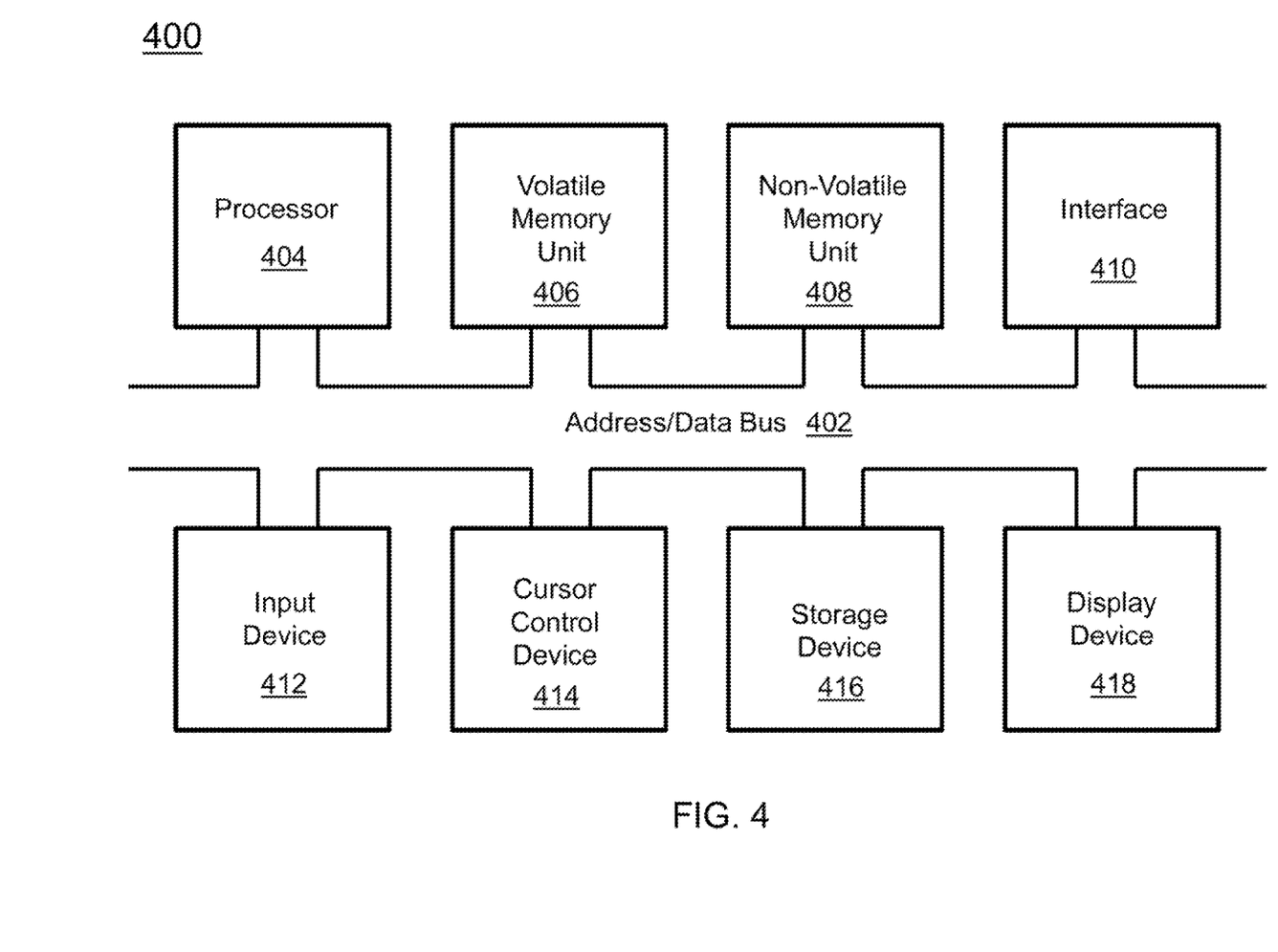
FIG. 4 is an illustration of a data processing system according to the principles of the present invention.

An example of a computer system 400 in accordance with one aspect is shown in FIG. 4. The computer system 400 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 400. When executed, the instructions cause the computer system 400 to perform specific actions and exhibit specific behavior, such as described herein.

The computer system 400 may include an address/data bus 402 that is configured to communicate information. Additionally, one or more data processing units, such as a processor 404, are coupled with the address/data bus 402. The processor 404 is configured to process information and instructions. In one aspect, the processor 404 is a microprocessor. Alternatively, the processor 404 may be a different type of processor such as a parallel processor, or a field programmable gate array. The computer system 400 is configured to utilize one or more data storage units. The computer system 400 may include a volatile memory unit 406 (e.g., random access memory ("RAM"), static RAM, dynamic RAM, etc.) coupled with the address/data bus 402, wherein a volatile memory unit 406 is configured to store information and instructions for the processor 404. The computer system 400 further may include a non-volatile memory unit 408 (e.g., read-only memory ("ROM"), programmable ROM ("PROM"), erasable programmable ROM ("EPROM"), electrically erasable programmable ROM "EEPROM"), flash memory, etc.) coupled with the address/ data bus 402, wherein the non-volatile memory unit 408 is configured to store static information and instructions for the processor 404. Alternatively, the computer system 400 may execute instructions retrieved from an online data storage unit such as in "Cloud" computing. In an embodiment, the computer system 400 also may include one or more interfaces, such as an interface 410, coupled with the address/data bus 402. The one or more interfaces are configured to enable the computer system 400 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 400 may include an input device 412 coupled with the address/data bus 402, wherein the input device 412 is configured to communicate information and command selections to the processor 400. In accordance with one aspect, the input device 412 is an alphanumeric input device, such as a keyboard, that may include alphanumeric and/or function keys. Alternatively, the input device 412 may be an input device other than an alphanumeric input device. In one aspect, the computer system 400 may include a cursor control device 414 coupled with the address/data bus 402, wherein the cursor control device 414 is configured to communicate user input information and/or command selections to the processor 400. In one aspect, the cursor control device 414 is implemented using a device such as a mouse, a track-ball, a track-pad, an optical tracking device, or a touch screen. The foregoing notwithstanding, in one aspect, the cursor control device 414 is directed and/or activated via input from the input device 412, such as in response to the use of special keys and key sequence commands associated with the input device 412. In an alternative aspect, the cursor control device 414 is configured to be directed or guided by voice commands.

In one aspect, the computer system 400 further may include one or more optional computer usable data storage devices, such as a storage device 416, coupled with the address/data bus 402. The storage device 416 is configured to store information and/or computer executable instructions. In one aspect, the storage device 416 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 418 is coupled with the address/data bus 402, wherein the display device 418 is configured to display video and/or graphics. In one aspect, the display device 418 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 400 presented herein is an example computing environment in accordance with one aspect. However, the non-limiting example of the computer system 400 is not strictly limited to being a computer system. For example, one aspect provides that the computer system 400 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 5:
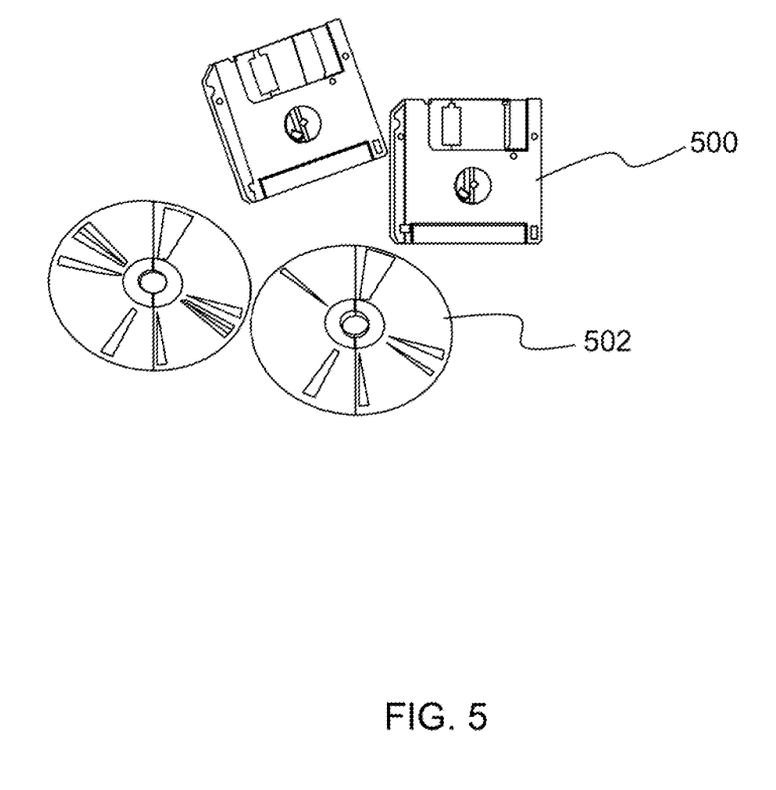
FIG. 5 is an illustration of a computer program product according to the principles of the present invention.

An illustrative diagram of a computer program product embodying an aspect of the present invention is depicted in FIG. 5. As a non-limiting example, the computer program product is depicted as either a floppy disk 500 or an optical disk 502. However, as mentioned previously, the computer program product generally represents computer readable code (i.e., instruction means or instructions) stored on any compatible non-transitory computer readable medium.

What is claimed is:

1. A system for discovering important elements that drive an online discussion of a topic, the system comprising:
one or more processors and a non-transitory memory having instructions encoded thereon such that when the instructions are executed, the one or more processors perform operations of:
receiving, as input, a message from an online discussion related to a topic;
analyzing the message for information related to the message;
generating a graph comprising a plurality of nodes, wherein each of the plurality of nodes represents an entity, resulting in a plurality of entities;
updating the graph over time as additional messages from the online discussion are received, such that additional nodes are generated and linked with at least one of the plurality of nodes by paths having path lengths;
determining a closeness value for each node based on the path lengths, resulting in a plurality of closeness values;
ranking the plurality of entities based on the plurality of closeness values, thereby providing a ranking of the plurality of entities by level of importance in the online discussion; and
outputting the ranking of the plurality of entities to a user.

2. The system as set forth in claim 1, wherein the one or more processors further perform an operation of determining the closeness value for each node according to the following:

$$cl(v) = \frac{1}{\frac{1}{|V|}\sum_{u \in V} d_G(u, v)},$$

where $d_G(u, v)$ denotes the shortest path length between nodes u and v, $\Sigma$ denotes a summation, $\epsilon$ denotes is an element of, and V is the total number of nodes in the graph.

3. The system as set forth in claim 2, wherein the closeness value represents a relative centrality of an entity to all other entities.

4. The system as set forth in claim 3, wherein the information related to the message is selected from a group consisting of user information, location information, hyperlink information, and annotation information.

5. The system as set forth in claim 4, wherein the location information is obtained from at least one of geo-coordinate information related to the message or location information in a user profile from the online discussion.

6. A computer-implemented method for discovering important elements that drive an online discussion of a topic, comprising:
an act of causing one or more processors to execute instructions stored on a non-transitory memory such that upon execution, the data processor performs operations of:
receiving, as input, a message from an online discussion related to a topic;
analyzing the message for information related to the message;
generating a graph comprising a plurality of nodes, wherein each of the plurality of nodes represents an entity, resulting in a plurality of entities;
updating the graph over time as additional messages from the online discussion are received, such that additional nodes are generated and linked with at least one of the plurality of nodes by paths having path lengths;
determining a closeness value for each node based on the path lengths, resulting in a plurality of closeness values;
ranking the plurality of entities based on the plurality of closeness values, thereby providing a ranking of the plurality of entities by level of importance in the online discussion; and
outputting the ranking of the plurality of entities to a user.

7. The method as set forth in claim 6, wherein the one or more processors further perform an operation of determining the closeness value for each node according to the following:

$$cl(v) = \frac{1}{\frac{1}{|V|}\sum_{u \in V} d_G(u, v)},$$

where $d_G(u, v)$ denotes the shortest path length between nodes u and v, $\Sigma$ denotes a summation, $\epsilon$ denotes is an element of, and V is the total number of nodes in the graph.

8. The method as set forth in claim 7, wherein the closeness value represents a relative centrality of an entity to all other entities.

9. The method as set forth in claim 8, wherein the information related to the message is selected from a group consisting of user information, location information, hyperlink information, and annotation information.

10. The method as set forth in claim 9, wherein the location information is obtained from at least one of geo-coordinate information related to the message or location information in a user profile from the online discussion.

11. A computer program product for gauging public interest in a topic using network analysis of online discussions, the computer program product comprising computer-readable instructions stored on a non-transitory computer-readable medium that are executable by a computer having a processor for causing the processor to perform operations of:
receiving, as input, a message from an online discussion related to a topic;
analyzing the message for information related to the message;
generating a graph comprising a plurality of nodes, wherein each of the plurality of nodes represents an entity, resulting in a plurality of entities;
updating the graph over time as additional messages from the online discussion are received, such that additional nodes are generated and linked with at least one of the plurality of nodes by paths having path lengths;
determining a closeness value for each node based on the path lengths, resulting in a plurality of closeness values;
ranking the plurality of entities based on the plurality of closeness values, thereby providing a ranking of the plurality of entities by level of importance in the online discussion; and
outputting the ranking of the plurality of entities to a user.

12. The computer program product as set forth in claim 11, further comprising instructions for causing the processor to perform an operation of determining the closeness value for each node according to the following:

$$cl(v) = \frac{1}{\frac{1}{|V|}\sum_{u \in V} d_G(u, v)},$$

where $d_G(u, v)$ denotes the shortest path length between nodes u and v, $\Sigma$ denotes a summation, $\epsilon$ denotes is an element of, and V is the total number of nodes in the graph.

13. The computer program product as set forth in claim 12, wherein the closeness value represents a relative centrality of an entity to all other entities.

14. The computer program product as set forth in claim 13, wherein the information related to the message is selected from a group consisting of user information, location information, hyperlink information, and annotation information.

15. The computer program product as set forth in claim 14, wherein the location information is obtained from at least one of geo-coordinate information related to the message or location information in a user profile from the online discussion.

16. A system for discovering important elements that drive an online discussion of a new consumer product, the system comprising:
one or more processors and a non-transitory memory having instructions encoded thereon such that when the instructions are executed, the one or more processors perform operations of:
receiving, as input, a message from an online discussion related to a topic;
analyzing the message for information related to the message;
generating a graph comprising a plurality of nodes, wherein each of the plurality of nodes represents an entity, resulting in a plurality of entities;
updating the graph over time as additional messages from the online discussion are received, such that additional nodes are generated and linked with at least one of the plurality of nodes by paths having path lengths;
determining a closeness value for each node based on the path lengths, resulting in a plurality of closeness values;
ranking the plurality of entities based on the plurality of closeness values, thereby providing a ranking of the plurality of entities by level of importance in the online discussion; and
outputting the ranking of the plurality of entities to a user;
wherein the user monitors an online discussion among consumers related to a new consumer product and uses the ranking of the plurality of entities to identify a set of discussion elements that drive the online discussion of the new consumer product.

\* \* \* \* \*